Aug. 5, 1947.  E. M. SKIPPER  2,425,270
METHOD AND APPARATUS FOR FORMING BLANKS
FOR POST AND PEDESTAL INSULATORS
Filed Oct. 4, 1944  2 Sheets-Sheet 1
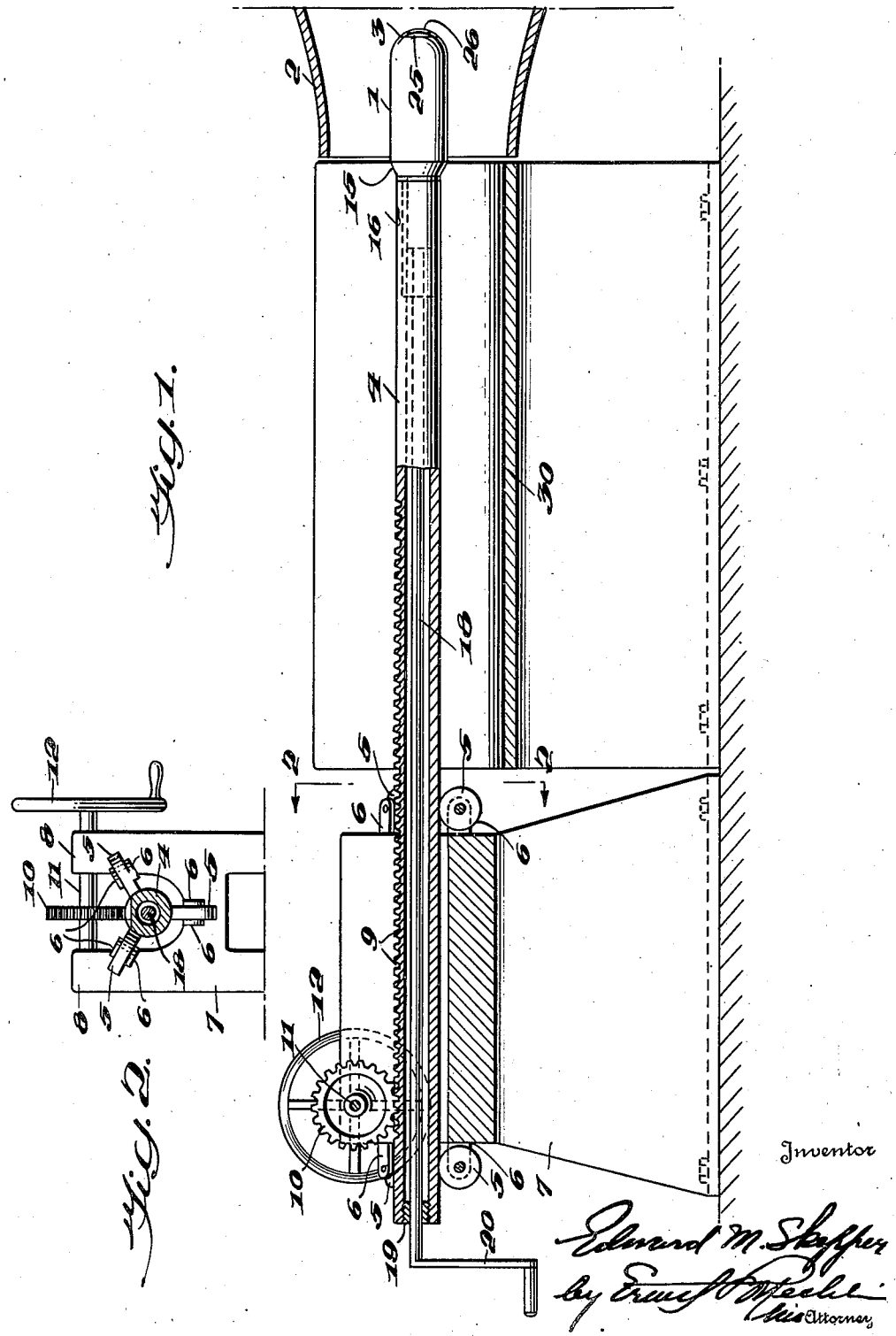

Aug. 5, 1947.   E. M. SKIPPER   2,425,270
METHOD AND APPARATUS FOR FORMING BLANKS
FOR POST AND PEDESTAL INSULATORS
Filed Oct. 4, 1944   2 Sheets-Sheet 2
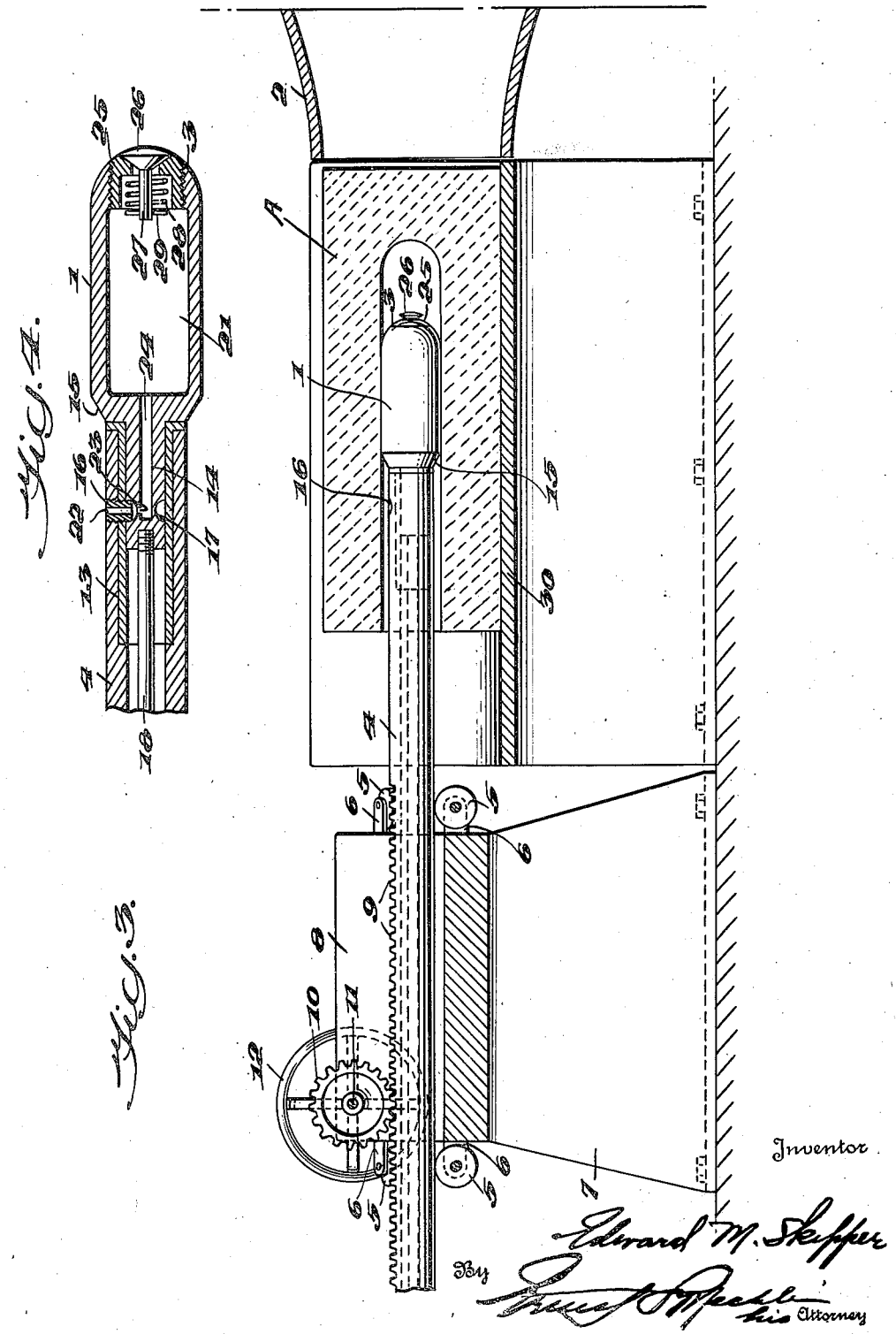

Patented Aug. 5, 1947

2,425,270

UNITED STATES PATENT OFFICE 2,425,270

METHOD AND APPARATUS FOR FORMING BLANKS FOR POST AND PEDESTAL INSULATORS

Edward M. Skipper, Baltimore, Md., assignor to Locke Insulator Corporation, Baltimore, Md., a corporation of Maryland Application October 4, 1944, Serial No. 557,187

12 Claims. (Cl. 25—3)

My invention relates to a method and apparatus for forming blanks for post or pedestal type insulators.

Hitherto insulators of this type have been customarily made by taking a cylindrical section of pug and cutting a cylindrical recess therein with a suitable coring tool. This cutting operation is laborious and expensive for, even though the hardest cutting tools be employed, the feldspar and flint in the pug rapidly dull the cutters and they must, therefore, be frequently renewed and resharpened.

In addition to the difficulty heretofore encountered in economically and expeditiously providing the blanks with cylindrical recesses or cavities, strains are set up in the blanks during the extrusion of the pug from the pug mill which impair the strength of the insulators. These strains are due to the friction between the peripheral layers of pug and the discharge nozzle of the pug mill which causes the pug at and adjacent the periphery of the section being extruded to move slower than the pug adjacent the central portion of the extruded section.

The principal object of the present invention is to provide a method and apparatus for forming a post or pedestal insulator blank with a cylindrical recess therein terminating short of one end of the blank, to thereby avoid either the boring of a cylindrical cavity within the pug or closing one end of a tubular blank formed by extruding the pug over a stationary mandrel.

A primary feature of the invention consists in forcing pug around a mandrel disposed within the discharge nozzle of a pug mill so as to substantially encase the mandrel within the pug, moving the mandrel and encasing pug from the nozzle and thereafter withdrawing the mandrel from the pug.

Another feature of the invention consists in providing a mandrel which is axially movable into the discharge nozzle of the pug mill and around which the pug is adapted to be extruded from the nozzle, the mandrel being retractable from the nozzle after being substantially encased by the pug and means being provided for withdrawing the mandrel from the encasing pug.

Another feature of the invention consists in rotatably mounting the mandrel so that it may be rotated with respect to the encasing pug and thus easily be moved axially thereof for withdrawal therefrom.

A further feature of the invention consists in providing means for admitting air into the cavity formed by the mandrel in the encasing pug as the mandrel is being withdrawn from the pug.

A still further feature of the invention consists in providing the mandrel with a chamber for receiving lubricant and with valve means through which the lubricant may pass from the chamber during withdrawal of the mandrel from the encasing pug to lubricate the exterior of the mandrel.

Other and more specific features of the invention, residing in advantageous forms, combinations and relations of parts, will hereinafter appear and be pointed out in the claims.

In the drawings.

Figure 1 is a vertical sectional view of an apparatus embodying my invention, the mandrel being shown in elevation within the discharge nozzle of a pug mill.

Figure 2 is a sectional view taken on line 2—2 of Figure 1.

Figure 3 is an enlarged longitudinal sectional view of the mandrel and associated parts of the apparatus in the positions they respectively occupy as the mandrel is being withdrawn from the encasing pug after the pug has been fully extruded and severed and the mandrel retracted from the nozzle of the pug mill.

Figure 4 is an enlarged longitudinal sectional view of the mandrel and adjacent portions of its supporting member.

Referring more particularly to the drawings, I indicates the mandrel of the insulator blank forming apparatus or machine which is movable axially into and out of the discharge nozzle 2 of a conventional pug mill, not shown. The mandrel is preferably of cylindrical shape in cross section having a rounded outer end or nose 3 and it is advantageously mounted on one end of a tubular member 4. The tubular member is supported for longitudinal movement in two sets of laterally spaced roller bearings or the like 5. The roller bearings of each set are circularly arranged, being preferably spaced 120° apart, and each is suitably mounted in brackets 6 which may be formed integrally or otherwise made rigid with opposite end portions of a bed or base member 7 which has spaced walls 8 projecting upwardly on opposite sides of the tubular member 4.

While the tubular member 4 and the mandrel I may be moved longitudinally by any suitable means, this may be easily and inexpensively accomplished by employing a simple rack and pinion means. To that end, the upper surface of the tubular member adjacent the end thereof remote from the discharge nozzle of the pug mill is formed with a rack 9 which is engageable by a pinion 10 mounted on a shaft 11 journaled in the walls 8 of the bed member 7. One end of the shaft 11 extends beyond the adjacent wall 8 and may there be advantageously provided with a hand wheel 12 whereby the shaft and pinion 10 may be easily rotated to cause the tubular member 4 to move longitudinally in the desired direction.

Instead of being rigid with the tubular member 4, the mandrel 1 is preferably arranged so as to be rotatable with respect thereto. For this purpose, the end of the tubular member on which the mandrel is mounted is interiorly provided with a bushing 13 of suitable material such, for example, as bronze within which the reduced inner end 14 of the mandrel is journaled. For a purpose which will hereinafter appear, the outer wall of the mandrel tapers inwardly and rearwardly, as indicated at 15, adjacent the reduced inner end portion 14.

To secure the mandrel against axial movement relative to the tubular member 4 and yet to permit it to rotate freely with respect thereto, the tubular member is provided with a screw threaded member 16 whose inner end projects into a groove 17 formed in the peripheral surface of the inner end 14 of the mandrel. The outer end of the screw threaded member is formed in any desired manner so that it may be easily rotated by a suitable tool into and out of operative position.

Rotary movement may be conveniently imparted to the mandrel by a rod 18 which is axially disposed within the tubular member 4. One end of the rod is screw threaded or otherwise connected to the mandrel while the other end which is journaled within a plug or the like 19 screw threaded within the adjacent end of the tubular member 4 has a laterally offset portion affording a crank 20 whereby the rod and consequently the mandrel may be easily rotated.

The mandrel 1 is preferably hollow so as to provide a chamber or compartment 21 for containing lubricant, not shown. The lubricant may be conveniently supplied to the chamber through an opening 22 which extends axially through screw 16 and which communicates with a port 23 connecting with a passageway 24 in the mandrel leading to the chamber.

Movably mounted within the nose of the mandrel is a screw threaded plug 25 affording a seat for a poppet type of valve 26. Disposed within a cavity within the plug 25 and surrounding the inwardly extending stem 27 of the valve is a coiled expansion spring 28, one end of which bears against the front wall of the plug and the other end of which bears against a pin 29 projecting laterally from opposite sides of the outer end of the valve stem. The spring thus serves to normally hold the valve against its seat but it is under relatively little compression so that the valve will readily move to open position whenever the pressure on the outside of the valve is only a little less than the pressure on the inside of the valve.

Chamber 21 is open to atmospheric pressure through passageway 24, port 23 and the opening in screw 16. The valve, therefore, will move to open position whenever the pressure on the outside thereof drops slightly below atmospheric pressure. Upon opening of the valve, some of the lubricant within the chamber will be drawn out through the valve opening and the outer face of the mandrel thus lubricated.

In the operation of the machine, the mandrel 1 is initially disposed within the discharge nozzle 2 of the pug mill in the position shown in Figure 1 of the drawings. The pug is then forced around the mandrel and extruded from the nozzle. The mandrel thus becomes encased within the pug and the pug is extruded from the nozzle in the form of a hollow cylinder onto an apron or the like 30 of substantially semi-cylindrical shape in cross section where it is supported in axial alignment with the nozzle against distortion. After a desired amount of the pug has been extruded, the mandrel is retracted from the nozzle simultaneously with the pug by the rack and pinion 9 and 10, respectively. The mandrel may be withdrawn from the nozzle at the same or at a slower rate than the pug is extruded therefrom but it will be found best not to withdraw it at a faster rate than that at which the pug moves.

After the mandrel has moved beyond the end of the nozzle a distance equal to or somewhat greater than the thickness of the walls of the extruded section of pug, the pug is severed by the conventional cutting wire, not shown, and further extrusion of the pug is stopped. The mandrel is then withdrawn from the encasing pug, designated A in Figure 3, wherein the mandrel is shown in the process of being withdrawn from the pug. Withdrawal of the mandrel may be most easily accomplished by first rotating it with respect to the pug, for the pug tends to stick to the mandrel and this adhesive hold may be more readily broken by rotating the mandrel with respect to the pug than by moving it axially thereof. After the mandrel has been rotated, the rack and pinion 9 and 10, respectively, are again operated to withdraw it from the encasing pug. The withdrawal of the mandrel from the pug is greatly facilitated by admitting air into the cavity formed within the pug by the mandrel as the mandrel is being withdrawn therefrom. Valve 26, therefore, automatically opens to admit air into the cavity just as soon as the mandrel starts to move axially with respect to the pug, for the pressure within the space in the cavity from which the mandrel has been withdrawn will be substantially less than atmospheric pressure. Withdrawal of the mandrel is also facilitated by the lubricant which is drawn out of chamber 21 upon opening of valve 26. Moreover, it may be frequently found desirable to rotate the mandrel during most of the withdrawal operation. It is to be noted that the construction of the valve is such that as the pug is being forced around the mandrel, the pressure of the pug, in addition to that of the spring, maintains the valve tightly against its seat.

It will be apparent to those skilled in the art that, by forming the pug in the manner indicated, a blank for a post or pedestal insulator is produced which need not be cored and which will not have the internal strains which usually occur when the pug is extruded in the form of a solid cylinder. It will also be appreciated that various modifications may be made in the details of the apparatus illustrated without departing from the spirit of the invention as defined in the appended claims.

What I claim is:

1. In a device of the character described, the combination with a pug mill having a substantially cylindrical discharge nozzle, of a cylindrical mandrel adapted to be moved axially into said discharge nozzle of said mill means for extruding a pug from said nozzle, said pug substantially encasing the adjacent portion of said mandrel, means for retracting said mandrel from the nozzle as the pug is being extruded therefrom, means for withdrawing the mandrel from the encasing pug after the latter has been removed from said nozzle, and means for rotating said mandrel with respect to the encasing pug to assist in its withdrawal therefrom.

2. In a device of the character described, the combination with a pug mill having a substantially cylindrical discharge nozzle, of a substantially cylindrical mandrel adapted to be moved into said discharge nozzle and around which the pug is adapted to be extruded from the nozzle, said mandrel being retractable axially from said nozzle with the pug after being substantially encased by the pug, means for rotating said mandrel with respect to the encasing pug, and means for withdrawing the mandrel axially from the encasing pug.

3. In a device of the character described, the combination with a pug mill having a substantially cylindrical discharge nozzle, of a substantially cylindrical mandrel adapted to be moved axially into said discharge nozzle, means for extruding a pug from said nozzle, said pug substantially encasing the adjacent portion of said mandrel, and means for retracting said mandrel from the nozzle as the pug is being extruded therefrom and for thereafter withdrawing the mandrel from the encasing pug.

4. In a device of the character described, the combination with a pug mill having a substantially cylindrical discharge nozzle, of a substantially cylindrical mandrel adapted to be moved axially into said discharge nozzle of said mill so as to be substantially encased within the pug extruded from the nozzle, means for retracting said mandrel from the nozzle during extrusion of the pug therefrom, means for withdrawing the mandrel from the encasing pug after the latter has been separated from the nozzle, and means for admitting air into the cavity formed by the mandrel in the encasing pug as the mandrel is being withdrawn therefrom.

5. In a device of the character described, the combination with a pug mill having a substantially cylindrical discharge nozzle, of a substantially cylindrical mandrel adapted to be moved into said discharge nozzle of said mill and around which the pug is adapted to be extruded from the nozzle, said mandrel being retractable axially from said nozzle with the pug after being substantially encased by the pug, means for withdrawing the mandrel axially from the encasing pug, and valve means in the outer end of said mandrel for admitting air into the cavity formed by the mandrel in the encasing pug as the mandrel is being withdrawn therefrom.

6. In a device of the character described, the combination with a pug mill having a substantially cylindrical discharge nozzle, of a substantially cylindrical mandrel adapted to be moved into said discharge nozzle of said mill and around which the pug is adapted to be extruded from the nozzle, said mandrel being retractable axially from said nozzle with the pug after being substantially encased by the pug, a chamber within said mandrel for receiving lubricant, means for withdrawing the mandrel axially from the encasing pug after being removed from the nozzle, and valve means in the mandrel through which lubricant may pass from said chamber during withdrawal of the mandrel from the encasing pug to lubricate the exterior of the mandrel.

7. A machine for forming insulator blanks involving a substantially cylindrical mandrel adapted to be moved axially into the discharge nozzle of a pug mill so as to be substantially encased within the pug extruded from the nozzle, mechanism for retracting said mandrel from the nozzle as the pug is being extruded therefrom, said mechanism including a tubular member on which said mandrel is rotatably mounted and means for moving said tubular member longitudinally for withdrawing the mandrel from the encasing pug, and means rotatably mounted within said tubular member for rotating said mandrel with respect to the encasing pug.

8. A machine for forming insulator blanks involving a substantially cylindrical mandrel adapted to be moved into the discharge nozzle of a pug mill and around which the pug is adapted to be extruded from the nozzle, said mandrel being retractable axially from said nozzle with the pug after being substantially encased by the pug, a longitudinally movable tubular member on which said mandrel is rotatably mounted, rack and pinion for withdrawing the mandrel axially from the encasing pug, and means rotatably mounted within said tubular member for rotating the mandrel with respect thereto.

9. The method of forming a blank for a post or pedestal type insulator which consists in forcing pug around a mandrel disposed within the discharge nozzle of a pug mill, extruding the pug from the nozzle, retracting the mandrel from the nozzle as the pug is being extruded therefrom, and withdrawing the mandrel from the surrounding pug.

10. The method of forming a blank for a post or pedestal type insulator which consists in forcing pug around a mandrel disposed within the discharge nozzle of a pug mill, retracting the mandrel from the pug encasing it as the latter is extruded from the nozzle, and thereafter withdrawing the mandrel from the encasing pug.

11. The method of forming a blank for a post or pedestal type insulator which consists in forcing pug around a mandrel disposed within the discharge nozzle of a pug mill, extruding the pug from the nozzle, retracting the mandrel from the nozzle during the extrusion of the pug therefrom, severing the extruded pug from the pug remaining in the mill at a point spaced from the outer end of the mandrel, and thereafter withdrawing the mandrel from the surrounding pug.

12. The method of forming a blank for a post or pedestal type insulator which consists in forcing pug around a mandrel disposed within the discharge nozzle of a pug mill whereby the mandrel is substantially encased within the pug, moving the mandrel and encasing pug from the nozzle, and simultaneously rotating and withdrawing said mandrel from the encasing pug.

EDWARD M. SKIPPER.

REFERENCES CITED

The following references are of record in the file of this patent:

UNITED STATES PATENTS

| Number | Name | Date |
| --- | --- | --- |
| 716,343 | Locke | Dec. 16, 1902 |
| 1,514,980 | Mathis | Nov. 11, 1924 |
| 368,591 | Jones et al. | Aug. 23, 1887 |
| 2,019,937 | Staples | Nov. 5, 1935 |